A. E. DOTY.
Corn-Planter.
No. 28,355.　　　　　　　　　　　　　　Patented May 22, 1860.
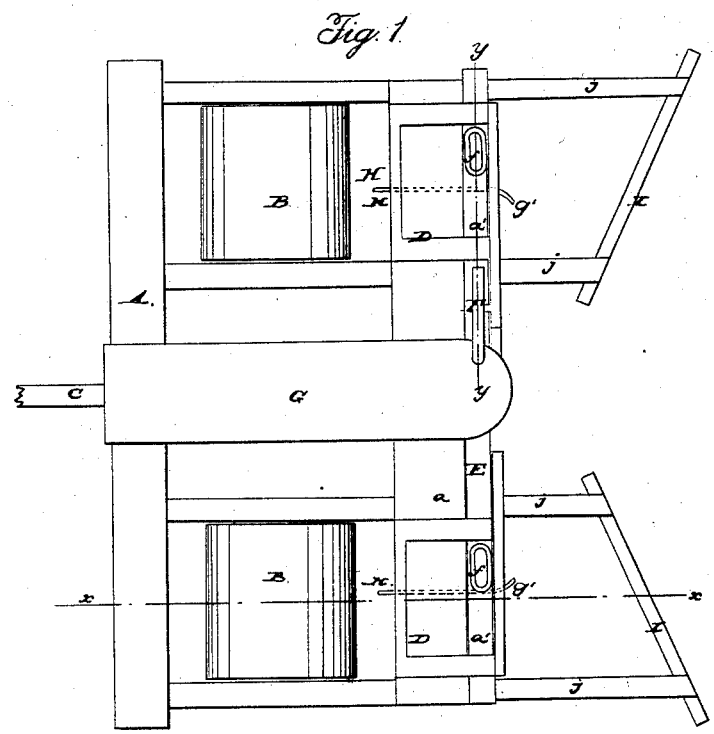
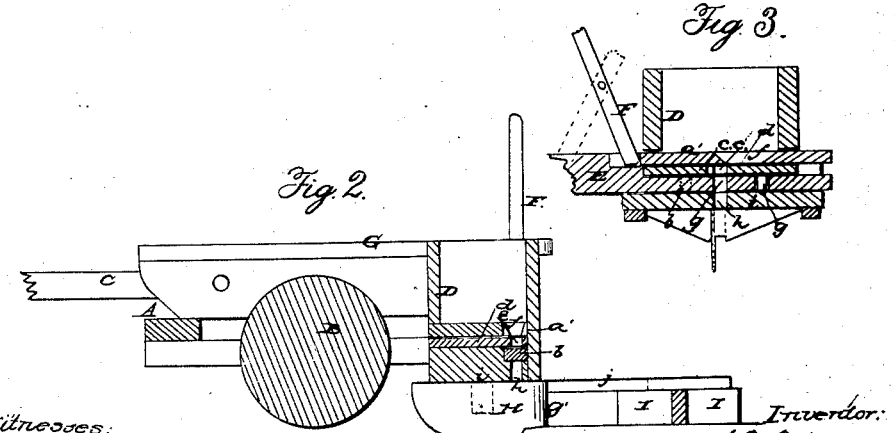

UNITED STATES PATENT OFFICE.

A. E. DOTY, OF NORTH HENDERSON, ILLINOIS.

IMPROVEMENT IN SEEDING-MACHINES.

Specification forming part of Letters Patent No. 28,355, dated May 22, 1860.

*To all whom it may concern:*

Be it known that I, A. E. DOTY, of North Henderson, in the county of Mercer and State of Illinois, have invented a new and Improved Seeding-Machine; and I do hereby declare that the following is a full, clear, and exact description of the same, reference being had to the annexed drawings, making a part of this specification, in which—

Figure 1 is a plan or top view of my invention; Fig. 2, a longitudinal section of the same, taken in the line $x\ x$, Fig. 1; Fig. 3, a section of one of the seed-boxes, taken in the line $y\ y$, Fig. 1.

Similar letters of reference indicate corresponding parts in the several figures.

To enable those skilled in the art to fully understand and construct my invention, I will proceed to describe it.

A represents the frame of the machine, which is mounted on rollers B B, has a draft-pole, C, attached to it at its front end, and two seed-boxes, D D, secured on it at its back part, one at each side, as shown plainly in Fig. 1. The seed-boxes are placed on a traverse-board, $a$, behind which a slide-bar, E, is placed, said bar passing underneath the seed-boxes, and having its upper surface flush with the bottoms of the seed-boxes. The slide-bar E is slotted longitudinally at each end, so as to form an upper and lower part, $a'\ b$, as shown in Figs. 2 and 3, the space between said parts being fitted by boards $c$ and a strip, $d$, which is provided with an aperture, $e$. This aperture measures the flow of seed or regulates its distribution.

In the upper part, $a'$, at each end of the slide, there is an elongated opening, $f$, (shown clearly in Figs. 1 and 3,) and in the lower parts, $b$, there are openings $g$. The slide-bar E is allowed to work freely back and forth, and it may be operated by a lever, F, moved by the hand of the attendant from seat G.

To the under side of the machine, below each seed-box D, there are attached plates H, one under each hopper. The front parts of these plates are straight, but the back parts are curved inward or toward the seat G, as plainly shown at $g'$ in Fig. 1. These plates are secured at the inner sides of discharge-opening $h$, which are in boards $i$, below the lower parts, $b$, of the slide-bar E, as shown clearly in Fig. 3. The plates H, of course, have an edgewise position, and their front parts are curved or rounded, serving as cutters or colters, while their curved back ends form the furrows.

To the back part of the machine there are attached by bars $j$ two oblique scrapers, I I, one behind each seed-box. These scrapers may be of wood shod with metal at their lower parts, if necessary, and they are placed in opposite position relatively with each other, the inner ends of the scrapers being nearer the machine than their outer ends, as shown clearly in Fig. 1.

The operation is as follows: As the machine is drawn along the driver or attendant moves the lever F back and forth, and the corn or other seed is distributed from the seed-boxes D at each movement of the lever F. The elongated openings $f$ always insure the filling of the openings $e$ below in the strips $d$, the contents of the openings $e$ being discharged when the openings $g$ come in contact with the openings $e$ and $h$. The seed falls into the furrows made by the curved parts $g'$ of the plates H, and the front parts of said plates divide all clods, grass, sods, &c., that may be in their paths. The scrapers I cover the seed and pulverize and level the earth over it. The plates H, arranged as shown, perform the two functions described in an admirable manner, the curved back parts, $g'$, not only forming the furrows, but also having a tendency to draw the seed therein, which is dropped at their sides just in front of the curved parts. These plates may be constructed with great facility at a very small cost. Strips $d$ having different-sized holes may be used, in order to regulate the amount of seed discharged.

Having thus described my invention, what I claim as new, and desire to secure by Letters Patent, is—

The arrangement of the double-acting plates H, openings $h$, boards $i$, slide-bars E, boxes D, levers F, rollers B, and scrapers I, all as and for the purpose herein shown and described.

A. E. DOTY.

Witnesses:
THOMAS SIBRELY,
JOHN DUFTON.